June 1, 1965 L. V. PFAENDER 3,186,812
METHOD AND APPARATUS FOR FORMING HOLLOW GLASS ARTICLES
Filed June 8, 1961 3 Sheets-Sheet 2
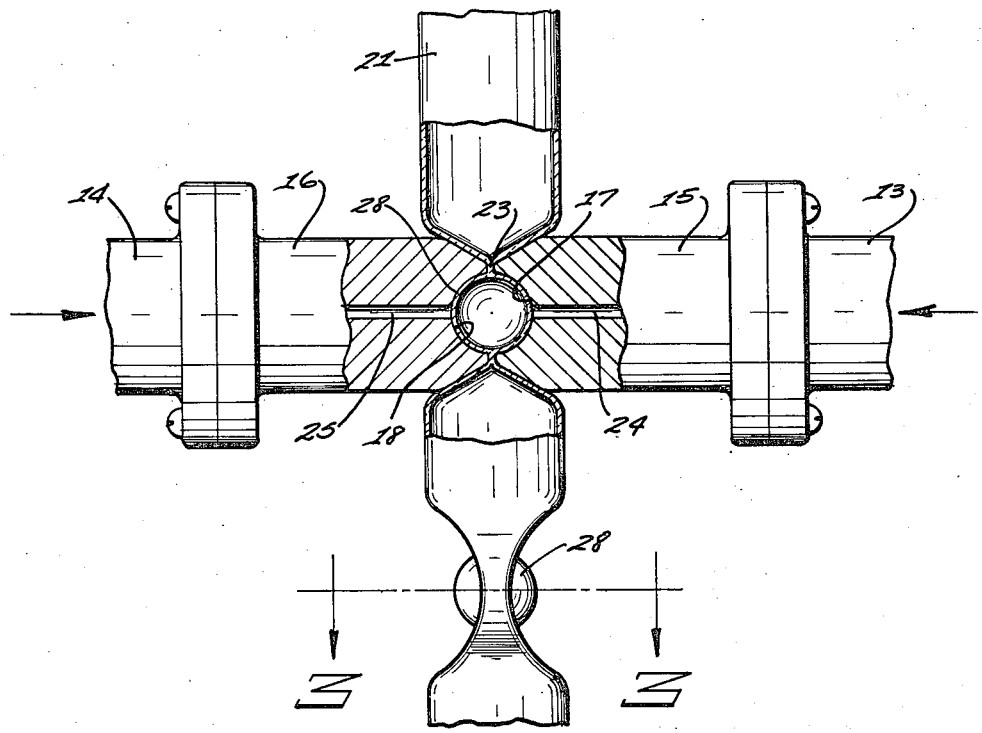
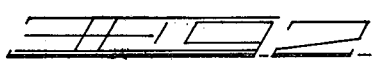
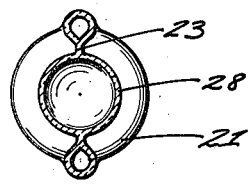
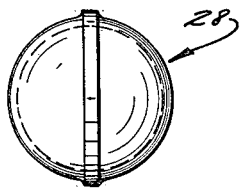
INVENTOR.
LAWRENCE V. PFAENDER
BY
ATTORNEYS

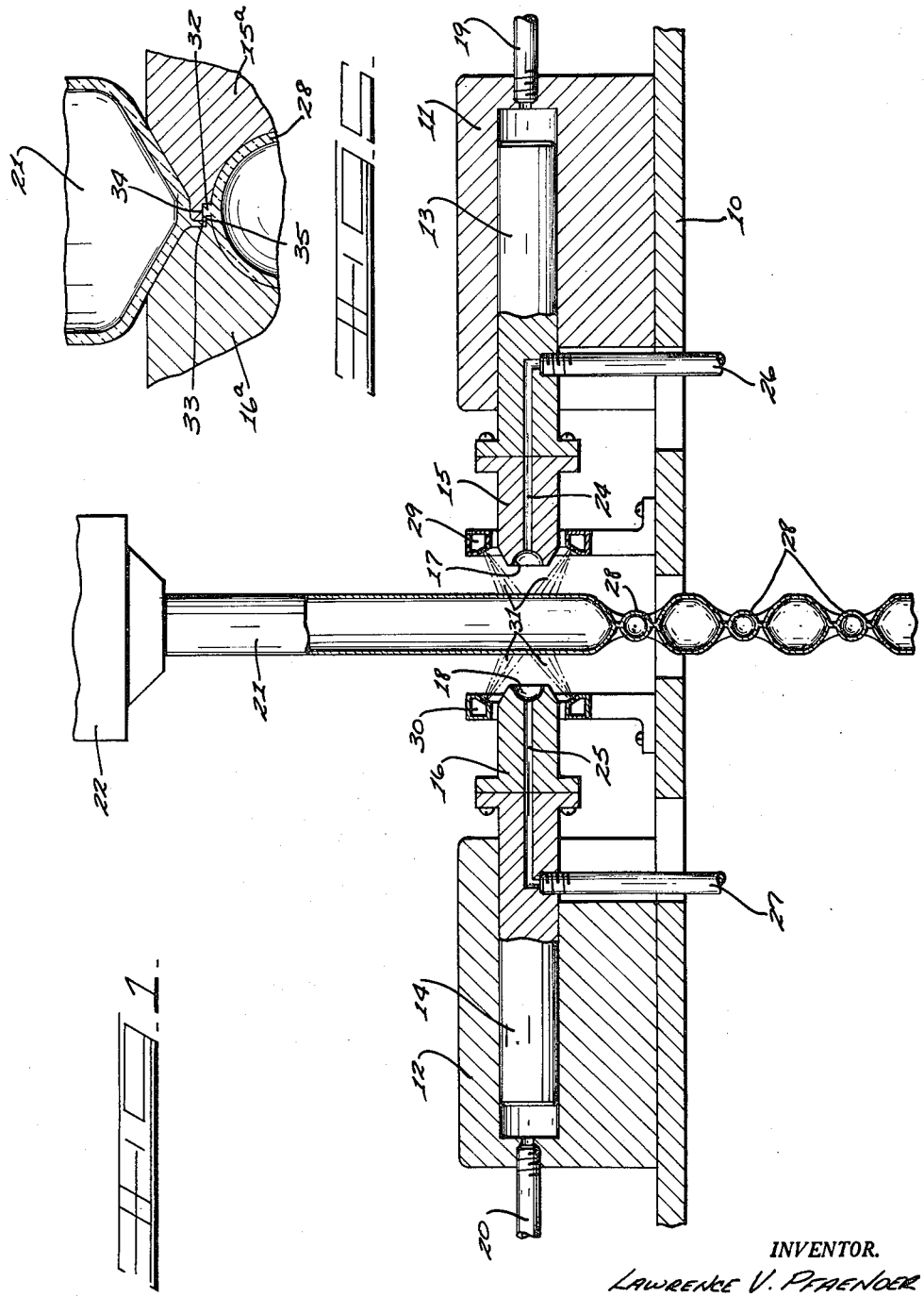

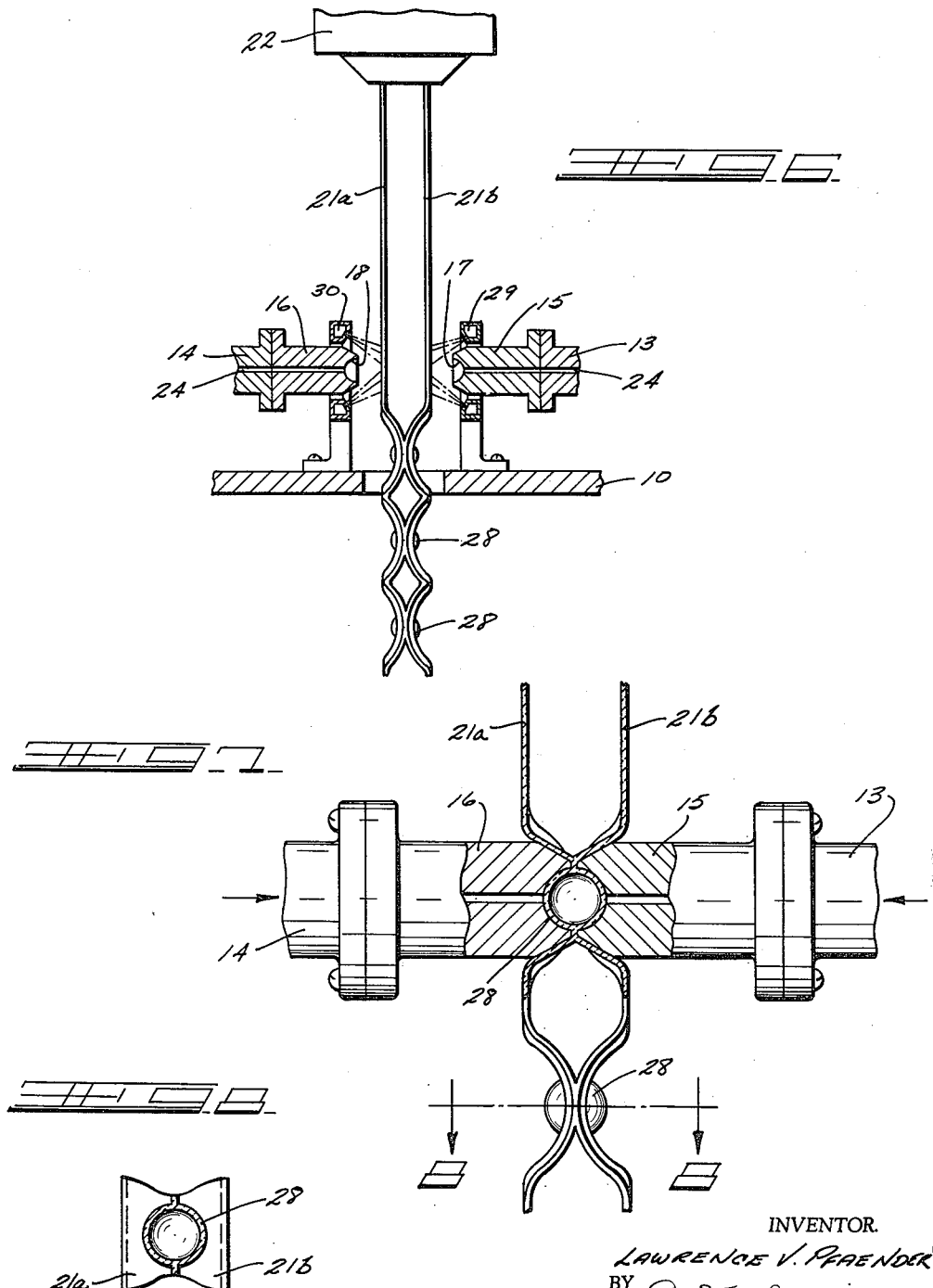

United States Patent Office 3,186,812
Patented June 1, 1965

3,186,812
METHOD AND APPARATUS FOR FORMING
HOLLOW GLASS ARTICLES
Lawrence V. Pfaender, Toledo, Ohio, assignor to Owens-Illinois Glass Company, a corporation of Ohio
Filed June 8, 1961, Ser. No. 115,648
5 Claims. (Cl. 65—55)

This invention relates to a method and apparatus for forming hollow glass articles without any vent openings therein. More particularly, this invention relates to a method and apparatus for forming hollow glass spheres from glass tubing or sheet glass.

The small glass spheres have use as an additive to drilling mud which is circulated through the drill pipe. It is well-known that the drilling mud functions to aid in carrying the cuttings from the drill bit and with the addition of small glass spheres to the mud, as it is fed through the drill stem, the spheres will be broken at the drill bit. Breaking the spheres will result in an implosion and due to the considerable hydrostatic head present in the well bore, the implosion of a number of spheres will fracture the formation being drilled and materially aid in the drilling operation. The drilling rate may be increased due to the formation fracture caused by implosion of the sphere.

By this invention it is contemplated to form hollow glass spheres by the steps of feeding two adjacent walls of heated, workable glass between a pair of semispherical concave die members, moving the die members toward each other against opposite walls of the hot glass thereby sealing the two walls of glass together along a circular path while entrapping air within the circular area. The application of a vacuum to the interior of the die members will cause the entrapped air to expand and force the hot glass into intimate contact with the concave die members. After the glass sphere is formed, the vacuum is released from the die members and the two die members will be moved apart.

With the foregoing in mind it is an object of this invention to provide a method and apparatus for forming hollow glass spheres and the like from either tubing or sheets of flat glass.

It is an additional object of this invention to provide a method and apparatus for forming hollow glass spheres from cold glass tubing or glass sheets.

It is a still further object of this invention to form hollow glass spheres from hot glass tubing or hot glass sheets or ribbons of hot glass.

Other and further objects will be apparent from the following description taken in conjunction with the annexed sheets of drawings wherein:

FIG. 1 is a schematic cross-sectional elevational of the sphere forming apparatus of the invention.

FIG. 2 is a view similar to FIG. 1, showing the die members in closed juxtaposed relationship, on an enlarged scale.

FIG. 3 is a cross-sectional view taken at line 3—3 on FIG. 2 illustrating the formed sphere still supported by the tubing from which it is formed.

FIG. 4 illustrates a sphere made in accordance with this invention at about twice its actual size.

FIG. 5 is a sectional elevation similar to FIG. 2 illustrating an alternative die face configuration.

FIG. 6 is a cross-sectional elevation similar to FIG. 1 illustrating the apparatus of the invention for forming spheres from two sheets of glass.

FIG. 7 is a view similar to FIG. 6 showing the die members in closed relationship, on an enlarged scale.

FIG. 8 is a cross-sectional view taken at line 8—8 on FIG. 7 illustrating the formed sphere still supported by the sheets from which it is formed.

This invention essentially performs two simultaneous functions in producing hollow glass articles from two adjacent walls of glass. The first is to form the outside shape using supporting die halves while the second is to seal the halves together.

There are some hollow glass articles for which it is not objectionable that they have prominent seam ribs. When this is the case, it has been found feasible to use the teachings of this invention to fabricate them at relatively low cost.

Referring now to the drawings, the apparatus is comprised of a base 10 upon which are mounted a pair of horizontal cylinders 11 and 12. The cylinders are mounted on the base in axial alignment and are adapted to have a pair of pistons 13 and 14 slidably received therein. The pistons 13 and 14 have oppositely disposed heads to which die members 15 and 16 are attached. The die members 15 and 16 have complementary concave semi-spherical faces 17 and 18 formed in the ends thereof. The faces 17 and 18 when moved into substantially abutting relationship form a complete spherical chamber therebetween.

As explained above, the pistons 13 and 14 are mounted for sliding movement in the cylinders 11 and 12 and upon the introduction of fluid under pressure through pipes 19 and 20, the two pistons will be moved toward each other. The die members 15 and 16 will engage the opposite sides of hollow glass tubing 21 which is positioned therebetween. The tubing 21 may be continuously fed from a molten glass feeder 22, in which case the tubing 21 is sufficiently plastic that movement of the die members 15 and 16 into closing position will seal the opposite walls of the tubing 21, as shown in FIGS. 2 and 3, at 23, while entrapping air within the sealed area.

The two die members 15 and 16 have axial passages 24 and 25 therein which open into the die faces 17 and 18. The passages 24 and 25 are connected by pipes 26 and 27 to a suitable source of vacuum so that when the two die members are moved into sealing relationship with respect to the tubing 21, a vacuum will be applied through the passages 24 and 25 and the entrapped air will expand and force the hot glass into the form defined by the faces 17 and 18 of the die members. After the spheres 28 are completely formed, the vacuum is disconnected from the pipes 26 and 27 and is simultaneously applied to the pipes 19 and 20 to effect separation of the die members 15 and 16.

While the apparatus has been described as useful for the formation of small spheres from heated glass tubing or tubing which has just been formed and still retains a substantial portion of its heat content, it should be pointed out that the method and apparatus of the invention is also applicable to forming spheres from previously produced glass tubing which is rigid.

When previously formed glass tubing is used, it is necessary to heat that portion of the tubing which is to be formed into spheres and this is accomplished by the use of annular gas burners 29 and 30, as shown in FIG. 1, which are fixed to the base 10 and are in surrounding relationship with respect to the die members 15 and 16.

The burners 29 and 30 take the form of annular chambers having small exit openings directed toward the glass tubing on opposite sides thereof so as to concentrate their heating effect on those areas of the tubing which are to be sealed together by relative movement of the die members 15 and 16. The dotted lines 31, issuing from the burners 29 and 30 (see FIG. 1) illustrate the spread of the individual burner jets.

With specific reference to FIG. 5 the die members 15a and 16a have cooperating edge portions, which, when moved together as shown in FIG. 5, will leave the seam rib 32 joined to the tubing 21 by a relatively thin, fragile, "flash" of glass 33 so that the spheres may be easily removed from the tubing 21. The die half 15a has a horizontally extending annular surface 34 which is adapted to approximately engage a surface 35 of an annular groove formed in the die half 16a. The "flash" 33 is the extremely thin portion of glass which will remain between the surfaces 34 and 35.

While the invention has been described primarily in terms of its formation of spheres from glass tubing, it should be pointed out that it is contemplated that spheres may be formed from two parallel sheets or ribbons of glass 21a and 21b (see FIGS. 6–8), which are positioned between die members 15 and 16 in the same manner as previously described with respect to the tubing 21. If the sheets or ribbons are fed from a molten glass feeder, they will retain sufficient heat so that they may be deformable or if the sheets or ribbons are initially at room temperature, they may be heated in the same manner as described with respect to the heating of the cold tubing so that it may be capable of being formed into hollow spheres.

The description of this invention has been limited to the disclosure of a single set of die members being successively opened and closed with respect to two spaced-apart glass wall members. However, it should be pointed out that the die members could be plural pairs acting in succession and opening and closing successively on continuously feeding tubing. For example, the die members could be mounted on the periphery of wheels which were rotating with approximate peripheral contact and the glass which is in workable condition could be fed between the rotating wheels so that the die members would successively contact the continuously moving glass tubing or wall members.

Various modifications may be resorted to within the spirit and scope of the appended claims.

I claim:
1. A method of forming hollow glass spheres, comprising the steps of continuously feeding two adjacent walls of heated glass between a pair of hemispherical, concave die members, moving said die members toward each other against opposite walls of the hot glass thereby sealing the two walls of glass together along a circular path while entrapping air within the circular area, thereafter applying a vacuum to the interior of said dies thus allowing entrapped air to expand, releasing said vacuum and moving said dies away from each other, whereby a hollow glass sphere is formed.

2. The method as set forth in claim 1 wherein said walls of heated glass are diametrically opposed sides of molten glass tubing.

3. A method of forming hollow glass articles from two adjacent glass wall members comprising heating the external surface of said walls at diametrically opposed sides thereof in substantially identical patterns, moving a pair of hemispherical, concave die members toward each other against opposite walls of the hot glass thereby sealing the two walls of glass together along a circular path while entrapping air within the circular area, thereafter applying a vacuum to the interior of said dies, releasing said vacuum, moving said dies out of contact with said heated wall portions and repeating the cycle on a subsequently positioned portion of said wall members, whereby hollow glass articles will be formed in succession.

4. The method as set forth in claim 3 wherein said glass wall members are flat sheets of glass lying in adjacent parallel plane.

5. A method of forming hollow articles from two adjacent thermoplastic wall members comprising heating the external surface of said walls at diametrically opposed sides thereof in substantially identical patterns, moving a pair of hemispherical, concave die members toward each other against opposite walls of the hot glass thereby sealing the two walls of glass together along a circular path while entrapping air within the circular area, applying a vacuum to the interior of said dies, releasing said vacuum and moving said dies out of contact with said heated wall portions whereby hollow articles will be formed.

References Cited by the Examiner
UNITED STATES PATENTS

| | | | |
|---|---|---|---|
| 1,430,699 | 10/22 | Stratford | 156—285 |
| 2,790,994 | 5/57 | Cardot et al. | 65—110 X |
| 3,025,426 | 3/62 | Camarata | 65—155 X |

DONALL H. SYLVESTER, *Primary Examiner.*